(12) United States Patent  
Primot et al.

(10) Patent No.: US 11,175,181 B2  
(45) Date of Patent: Nov. 16, 2021

(54) DEVICE FOR IMAGING AND DELIVERING SPECTROSCOPIC INFORMATION

(71) Applicant: OFFICE NATIONAL D'ETUDES ET DE RECHERCHES AÉROSPATIALES, Palaiseau (FR)

(72) Inventors: Jérôme Primot, Chatillon (FR); Sabine Suffis, Gif sur Yvette (FR); Sophie Thetas, Saint-Arnoult-en-Yvelines (FR); Cindy Bellanger, Massy (FR); Alain Kattnig, Bures-sur-Yvette (FR); Riad Haïdar, Paris (FR); Julien Jaeck, Bures-sur-Yvette (FR); Patrick Bouchon, Verrieres le Buisson (FR); Micke Boher, Longpont-sur-Orge (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 0 days.

(21) Appl. No.: 16/970,747

(22) PCT Filed: Feb. 22, 2019

(86) PCT No.: PCT/EP2019/054425  
§ 371 (c)(1),  
(2) Date: Aug. 18, 2020

(87) PCT Pub. No.: WO2019/162431  
PCT Pub. Date: Aug. 29, 2019

(65) Prior Publication Data  
US 2021/0010858 A1    Jan. 14, 2021

(30) Foreign Application Priority Data  
Feb. 22, 2018   (FR) ...................... 18 51550

(51) Int. Cl.  
*G01J 3/02* (2006.01)  
*G01J 3/50* (2006.01)  
(Continued)

(52) U.S. Cl.  
CPC ............... *G01J 3/0205* (2013.01); *G01J 3/50* (2013.01); *G02B 13/06* (2013.01); *G02B 26/06* (2013.01);  
(Continued)

(58) Field of Classification Search  
CPC ...... G01J 3/0205; G01J 3/50; G01J 2003/466; G02B 13/06; G02B 26/06; G06K 9/00771; G06K 9/2018; G06K 9/4652; H04N 7/183  
See application file for complete search history.

(56) References Cited

U.S. PATENT DOCUMENTS 8,558,873 B2    10/2013  McEldowney  
2013/0208332 A1*  8/2013  Yu .......................... G02B 1/002  
                                              359/240  
(Continued)

FOREIGN PATENT DOCUMENTS

JP          5734191         6/2015

OTHER PUBLICATIONS

Nanfang Flat Optics: Controlling Wavefronts With Optical Antenna Metasurfaces published in IEEE Journal of Selected Topics in Quantum Electronics, vol. 19, No. 3, May/Jun. 2013 (Year: 2013).*  
(Continued)

*Primary Examiner* — Nasim N Nirjhar  
(74) *Attorney, Agent, or Firm* — Nixon & Vanderhye

(57) ABSTRACT

A device for imaging and delivering spectroscopic information comprises an objective (1), an image sensor (2) and an optical component (3) having a spectral differentiation function. The optical component having a spectral differentiation  
(Continued)

function modifies the image of a point in different ways for at least two colours, so that a form of the image of the point delivers spectroscopic information that appears directly in the image as captured by the image sensor. Such device may be used in a detection and/or surveillance system, which then possesses a lower probability of false alarm value.

12 Claims, 7 Drawing Sheets

(51) Int. Cl.
    *G02B 13/06*     (2006.01)
    *G02B 26/06*     (2006.01)
    *G06K 9/00*     (2006.01)
    *G06K 9/20*     (2006.01)
    *G06K 9/46*     (2006.01)
    *G01J 3/46*     (2006.01)
    *H04N 7/18*     (2006.01)

(52) U.S. Cl.
    CPC ....... *G06K 9/00771* (2013.01); *G06K 9/2018* (2013.01); *G06K 9/4652* (2013.01); *G01J 2003/466* (2013.01); *H04N 7/183* (2013.01)

(56) References Cited

U.S. PATENT DOCUMENTS

| | | | |
|---|---|---|---|
| 2013/0229662 A1* | 9/2013 | Ogawa | G01M 11/331 356/453 |
| 2016/0306079 A1 | 10/2016 | Arbabi et al. | |
| 2018/0107015 A1* | 4/2018 | Dumpelmann | G02B 1/08 |
| 2020/0158799 A1* | 5/2020 | Nevzorov | G01R 33/34007 |

OTHER PUBLICATIONS

Yu et al., "Fiat Optics: Controlling Wavefronts With Optical Antenna Metasurfaces," IEEE Journal of Selected Topics in Quantum Electronics, vol. 19., No. 3, May 1, 2013, 23 pages.

International Search Report for PCT/EP2019/054425, dated May 3, 2019, 5 pages.

Written Opinion of the ISA for PCT/EP2019/054425, dated May 3, 2019, 8 pages.

* cited by examiner

DEVICE FOR IMAGING AND DELIVERING SPECTROSCOPIC INFORMATION

This application is the U.S. national phase of International Application No. PCT/EP2019/054425 filed 22 Feb. 2019, which designated the U.S. and claims priority to FR Patent Application No. 18 51550 filed 22 Feb. 2018, the entire contents of each of which are hereby incorporated by reference.

The present invention relates to a device for imaging and delivering spectroscopic information.

Optical detection and/or surveillance applications exist, for which information that can be collected from images are insufficient to lead to a probability of false alarm that is low, and/or that do not make it possible to sufficiently characterise an object that appears in the captured images. Indeed, in order to produce an optical surveillance, the content of a field to be monitored is commonly captured in images repetitively, for example at a rate of ten images per second, and each image is analysed, or the variations that occur between successive accumulations are analysed, in order to detect events that would occur within the field of surveillance. In general, the field to be monitored is wide or very wide, so that a large entrance optical field objective is used, or even in some cases a very wide entrance optical field objective, said to be of fish-eye type. If the event sought consists of an object that is small with respect to the extension of the entrance optical field, said object may appear in the images that are captured with a size close to the spatial resolution limit of the imaging device, or smaller, or even much smaller than said resolution limit. Then, for reducing the probability of false alarm, filters can be applied in relation to the apparent contrast of the object in the captured images, and/or in relation to the trajectory of the object that is revealed by the images captured successively. Nevertheless, the values of false alarm probability that are thus obtained may also be too high.

In order to reduce the value of probability of false alarm, it has also been proposed to collect spectral information of the object that is detected optically, in addition to the imaging information. Thus, multispectral or hyperspectral cameras are proposed for detection or surveillance applications. But such multi- or hyperspectral cameras are complex and expensive, and require significant calculation means to correlate images that are simultaneously captured according to a plurality of colours, in order to characterise the object that appears in a plurality of these images.

Interferometric systems have also been proposed to produce spectral information, but they are also complex to implement and/or expensive.

Such detection and surveillance needs appear in many situations, in particular in the civilian field, such as satellite remote detection for example, that is to say the detection by imaging from a satellite of objects that are at the surface of the Earth.

However, a military application is missile launch detection within a high-risk area, when such launches may constitute threats. One or more device(s) for surveillance by imaging is (are) then pointed towards the high-risk area, each having an entrance optical field that contains all or a part of said area, and the appearance of at least one missile that would have just taken off is sought in images that are captured continuously. The objective is then to acquire as quickly as possible optical information that makes it possible to confirm the occurrence of a missile launch, and optionally to determine in addition the type of threat, for example the type of missile that has been launched, in order to undertake the appropriate responses as quickly as possible. The causes of false alarms in the case of such a missile launch surveillance may be solar reflections, including on portions of clouds, on civilian aircraft and even birds.

One object of the present invention is then to propose a new optical device that is adapted for detection and/or surveillance applications, and that makes it possible to obtain lower values of probability of false alarm.

An additional object of the invention is to deliver spectroscopic information about an object that is detected by imaging within the entrance optical field, said spectroscopic information helping to characterise the object detected, for example by differentiating between a plurality of possibilities with regard to the type of object detected.

Other additional objects of the invention are that such device is simple to implement, robust, reliable, quick at delivering information about the object detected, and fairly inexpensive or with an addition cost compared to existing detection and/or surveillance systems that is limited.

In order to achieve these objects or others, the invention proposes a device for imaging and delivering spectroscopic information that comprises:

an objective, adapted to form in a focal plane an image of a scene that is contained in an entrance optical field of the imaging device;

an image sensor, which is disposed in the focal plane to capture the image of the scene; and at least one optical component having a spectral differentiation function, which is placed on a path of light rays between the scene and the focal plane.

According to the invention, the optical component having a spectral differentiation function is adapted to modify an image of a point of the scene when the objective is provided with this optical component, when compared to the image of the same point of the scene as formed by the objective devoid of the optical component. Furthermore, the image of the point of the scene is modified in different ways for at least two possible colours for the light rays that originate from the point of the scene. Thus, a form of the image of the point of the scene, which appears in the image as captured by the image sensor, delivers spectroscopic information about the point of the scene.

In other words, the optical component having a spectral differentiation function replaces in the captured image, the actual form of an object with an apparent form that delivers spectroscopic information about the light radiation—or electromagnetic radiation—that originates from the object. This spectroscopic information may then contribute to identifying the nature or type of the object that appears in one of the captured images. Particularly, it may make it possible to differentiate between an object of interest and a cause of false alarm. The probability of false alarm is thus reduced for a device according to the invention.

Furthermore, the spectroscopic information is directly contained in each image that is captured, so that the device of the invention does not need to multiply the imaging channels, or add a spectrophotometric acquisition channel in addition to the imaging channel. The imaging device, functional in a spectral range that contains the colours sought, is sufficient as optical equipment for implementing the invention. The spectroscopic information may be obtained by an image analysis process that is applied separately to each captured image. In particular, this may be a simple and quick image process, such as for example a Fourier transform process applied to the content of each image that is captured. Particularly, no calibration is necessary for recovering the apparent form of the object in the image, this apparent form delivering the spectroscopic information. For these reasons, the device of the invention may be particularly simple, quick to implement, and only generate a limited additional cost, mainly limited to the optical component having a spectral differentiation function.

For many situations of use of a detection and/or surveillance device, and as already mentioned above, the object of interest that is detected may be small in the entrance optical field, and often close to the spatial resolution limit of the imaging device, or smaller, or even much smaller than said resolution limit. The actual form or the object is then poorly rendered in each image, or even does not appear, so that the replacement of this actual form of the object in the captured images with a form for spectroscopic information does not constitute a significant loss of imaging information, but constitutes a gain in spectral information that makes it possible to better characterise the object detected and reduce the probability of false alarm.

Within the scope of the present invention, colour of electromagnetic radiation, or of light rays, means a continuous wavelength range that is restricted around a central wavelength, and wherein the radiation has a non-zero spectral energy. Particularly, the word colour is used throughout the present description without limitation to the spectral range of the light that is visible for Humans. Therefore, it applies in particular in the visible range, but also in the entire infrared range, and optionally also in the near-ultraviolet range.

Preferably, the optical component having a spectral differentiation function may be adapted to modify the image of the point of the scene according to a first image pattern for light rays of a first colour that originate from this point of the scene, and to modify the image of the same point of the scene according to a second image pattern for light rays of a second colour that also originate from this point of the scene. The first and second colours are spectrally separated, and the first and second image patterns are different. In the jargon of the Person skilled in the art, each image pattern is called "Point Spread Function", corresponding to the acronym PSF, or also "optical impulse response". Thus, the pattern that is apparent in the image at the location of the geometric image of an object of the scene is an indication of the colour composition of this object: if the apparent pattern corresponds to the first image pattern only, then the object emits radiation of the first colour, if the apparent pattern corresponds to the second image pattern only, then the object emits radiation of the second colour, and if the apparent pattern is a superimposition of both image patterns, then the object emits radiation that simultaneously includes the two colours. Obviously, the optical component may detect more than two colours if it is designed to associate different image patterns with three or more colours. Searching for a predetermined image pattern in a captured image may be produced in particular by applying a Fourier transform process to the image content.

In particular, the optical component having a spectral differentiation function may be adapted to stretch, shift or split the image of the point of the scene, in the image as captured by the image sensor, according to stretching, shifting or splitting directions that are different between the two possible colours for the light rays that originate from the point of the scene.

Generally for the invention, the optical component having a spectral differentiation function may be adapted to phase-shift light rays that originate from a same point of the scene but that pass through two different portions of a transverse section of the device, in accordance with a first phase shift difference effective between these two portions for a first colour possible for the light rays, and in accordance with a second phase shift difference effective also between the same two portions but for a second colour also possible for the light rays, the two colours being spectrally separated and the two phase shift differences being different. In other words, the light rays of each colour are affected differently in phase shift depending on the portion of the transverse section of the device that they pass through, for at least one of the two colours, and the phase shift differences between the two portions of the transverse section of the device are not the same for the two colours. Thus, in accordance with the invention, the optical component having a spectral differentiation function may be a selective indicator for one at least of the two colours, or for each of the two colours, or for a greater number of colours. Some of the phase shift differences that are produced by the optical component having a spectral differentiation function between the two portions of the transverse section of the device, such as used in the invention, may optionally be zero between two different portions of the transverse section, for at least one colour whereas they are non-zero for at least one other colour.

Within the scope of the present invention, transverse section of the device means a portion of surface that intersects the optical axis of the device and all of the light rays that contribute to forming the image captured by the image sensor. Such transverse section may be flat, or not, correspond to a pupil of the objective or not, correspond or not to an optical lens or mirror surface that enters in the constitution of the objective, or be formed by a support that is dedicated to the optical component having a spectral differentiation function. Such a transverse section has no limitation with respect to a possible longitudinal optical centre of the objective.

In simple embodiments of the invention, the optical component having a spectral differentiation function may be a wave plate, whereof the phase shift features, for at least one colour, vary between different portions of the transverse section of the device. Preferably, these phase shift features of such wave plate vary between the various portions of the transverse section of the device in ways that are different between the first colour and the second colour. Such wave plate may particularly consist at least partially of one film of a dielectric material whereof the thickness varies per areas in the transverse section of the device.

In preferred embodiments of the invention, the optical component having a spectral differentiation function may include identical electromagnetic resonators that are each efficient for phase-shifting and/or attenuating light rays in a variable manner when a colour of said light rays varies with respect to a resonance wavelength of each resonator. These identical resonators are distributed in one of the portions of the transverse section of the device, with the exception of at least one another portion of this transverse section.

Preferably, each of the electromagnetic resonators of the optical component having a spectral differentiation function may possess at least one dimension, measured parallel to the transverse section of the device, which is less than the resonance wavelength of this resonator. In the jargon of the Person skilled in the art, such electromagnetic resonators are called nano-resonators, even though one or each of the dimensions thereof may be greater than a few nanometres or a few tens of nanometres. Their use may make it possible to limit a parasitic diffusion of light that the resonators could produce. In this way, the image patterns used to produce the spectral differentiation function may be defined more accurately. For example, a device according to the invention may thus be particularly adapted to imaging and spectrographic information functions that are effective in the visible and near-infrared ranges when each electromagnetic resonator has at least one dimension, measured parallel to the transverse section of the device, which is less than 1 μm (micrometre).

Possibly, the optical component may include electromagnetic resonators of a plurality of different types, corresponding to resonance wavelengths that are different between resonators of different types. Alternatively or in combination, electromagnetic resonators of different types may correspond to phase shift values relative to a same wavelength that are different. Then, the resonators of each type are contained in a portion of the transverse section of the device that has at least one edge with an orientation, within the transverse section, different from the orientation of at least one edge of each other portion of the transverse section of the device that contains resonators of another type. In this way, the device of the invention can indicate the presence or absence of a plurality of colours in the radiation that is produced by the object detected. More complete spectral information is thus available, in particular to identify the nature or type of the object that is detected.

In particular embodiments of the invention, the optical component may include N types of electromagnetic resonators, N being an integer that is between 1 and 33, that is to say from 2 to $2^5$. A portion of the transverse section of the device may then be divided into N areas, each area possibly being an angular sector that extends from a central point of this portion of transverse section. In such a configuration, each portion of the transverse section of the device, which is dedicated to containing all the electromagnetic resonators of one of the types, may within the portion of transverse section consist of a selection of one or more of the areas, this selection being specific to said type of resonators in relation to the other types of resonators. However, the portion of transverse section that is dedicated to containing all the electromagnetic resonators of one of the types may also contain in addition part of the resonators of some of the other types.

For example, in order to characterise two colours in the electromagnetic radiation that originates from the object detected, N may be equal to 3, and the portion of transverse section of the device may be divided into first, second and third areas. For example, each area may be an angular sector that extends from a centre of the portion of transverse section, and the three areas may have respective angular widths that are equal. The electromagnetic resonators of first, second and third types may then be contained separately in the first, second and third areas, with only one of the types of electromagnetic resonators per area. Furthermore, the electromagnetic resonators may be adapted to produce phase shift differences that are equal to $2\cdot\pi/3\pm\pi/4$, that is to say between $2\cdot\pi/3-\pi/4$ and $2\cdot\pi/3+\pi/4$, preferably between $2\cdot\pi/3-\pi/8$ and $2\cdot\pi/3+\pi/8$, for a first colour when passing from one of the areas to another according to a route oriented in the portion of transverse section, and equal to $4\cdot\pi/3\pm\pi/4$, that is to say between $4\cdot\pi/3-\pi/4$ and $4\cdot\pi/3+\pi/4$, preferably between $4\cdot\pi3-\pi/8$ and $4\cdot\pi/3+\pi/8$ for a second colour when passing from one of the areas to another according to the same route oriented in the portion of transverse section, the first and second colours being spectrally separated. The same phase shift differences according to a same partition of areas within the portion of transverse section may be produced alternatively by a wave plate, in replacement of the use of electromagnetic resonators.

Otherwise, but also to characterise two colours in the electromagnetic radiation that originates from the object detected, N may be equal to 4, and the portion of transverse section of the device may be divided into first, second, third and fourth areas. Particularly, each area may also be an angular sector that extends from the centre of the portion of transverse section, and the four areas may also have respective angular widths that are equal. Electromagnetic resonators of first, second, third and fourth types may then be contained in the first, second, third and fourth areas with two types of electromagnetic resonators per area, and by varying only one type of electromagnetic resonators between two areas that are neighbours within the portion of transverse section. Furthermore, the electromagnetic resonators may be adapted to produce phase shift differences that are equal to:

$\pi\pm\pi/4$, that is to say between $3\cdot\pi/4$ and $5\cdot\pi/4$, preferably between $7\cdot\pi/8$ and $9\cdot\pi/8$, for a first colour between those of the areas that are separated according to a first boundary direction within the portion of transverse section;

$0\pm\pi/4$, that is to say between $-\pi/4$ and $+\pi/4$, preferably between $-\pi/8$ and $+\pi/8$, for the same first colour between those of the areas that are separated according to a second boundary direction different from the first boundary direction within the portion of transverse section;

$\pi\pm\pi/4$, that is to say between $3\cdot\pi/4$ and $5\cdot\pi/4$, preferably between $7\cdot\pi/8$ and $9\cdot\pi/8$, for a second colour between those of the areas that are separated according to the second boundary direction within the portion of transverse section, the first and second colours being spectrally separated; and $0\pm\pi/4$, that is to say between $-\pi/4$ and $+\pi/4$, preferably between $-\pi/8$ and $+\pi/8$, for the second colour between those of the areas that are separated according to the first boundary direction within the portion of transverse section.

Preferably, the first and second boundary directions between areas that are neighbours in the portion of transverse section of the device, may be perpendicular.

According to an improvement of the invention that may be adapted in particular to wide-angle or fish-eye type objectives, a pattern that is formed by the areas contained in the portion of the transverse section of the device, such as implemented previously, with the electromagnetic resonators that are contained in each of the areas, may be repeated in the transverse section of the device so as to form a tiling of this transverse section.

In possible embodiments of the invention, each electromagnetic resonator may be one of:

a nano-antenna of metal-insulator-metal type, and the optical component having a spectral differentiation function is then used to reflect the light rays within the device;

a metal nano-rod that is disposed on a transparent support, and in this case, the optical component having a spectral differentiation function is used to transmit the light rays through the transparent support within the device; and a cavity or a portion of a dielectric material that is between at least two electrically conductive portions, and that forms a Helmholtz resonator efficient in reflection for an electromagnetic radiation impinging onto the cavity or the portion of dielectric material, and the optical component having a spectral differentiation function is used again to reflect the light rays within the device.

Possibly, the optical component having a spectral differentiation function may be disposed on an optical face of a lens of the objective, or may form a reflective optical face of the objective, in both cases preferably an input optical face of the objective.

Generally, the device of the invention may further comprise means for analysing the image of the scene that is captured by the image sensor, these analysis means being adapted to apply a Fourier transform process to the image of the scene, and to produce the spectroscopic information from a result of the Fourier transform process.

For a surveillance application in a field that is wide, that is to say with an aperture angle of the entrance optical field that is greater than 120°, the objective may be of a wide-angle or fish-eye type.

Finally, the device may further comprise:
driver means, which are adapted to control successive captures of images by the image sensor when the objective is provided with the optical component having a spectral differentiation function, and to control the analysis means so as to deliver the spectroscopic information for at least one point of the scene from each captured image;
memory means, which are adapted to store at least one spectroscopic criterion;
comparison means, which are arranged to compare with the criterion stored in memory, the spectroscopic information delivered for the point of the scene from at least one of the captured images; and
detection means, which are adapted to produce a positive detection message when the spectroscopic information that is obtained for the point of the scene corresponds to the criterion stored in memory.

Other specific features and advantages of the present invention will become apparent in the following description of non-limiting examples of embodiments, with reference to the appended drawings, wherein:

FIG. 1 is a longitudinal section of a device for imaging and delivering spectroscopic information that is in accordance with the invention;

FIGS. 2a, 2b and 2c respectively show a division of a transverse section of a device that is in accordance with FIG. 1 (FIG. 2a), and resulting image patterns (FIGS. 2b and 2c) that may be used to detect two colours in accordance with first embodiments of the invention;

FIG. 3a is a diagram of phase shift values that are produced by nano-antennas, as a function of a wavelength of an electromagnetic radiation, for a plurality of length values of the nano-antennas;

FIG. 3b corresponds to FIG. 2a, for another division of the transverse section of the device of FIG. 1, and with a distribution of nano-antennas of four different types in accordance with second embodiments of the invention;

Figure 3A:
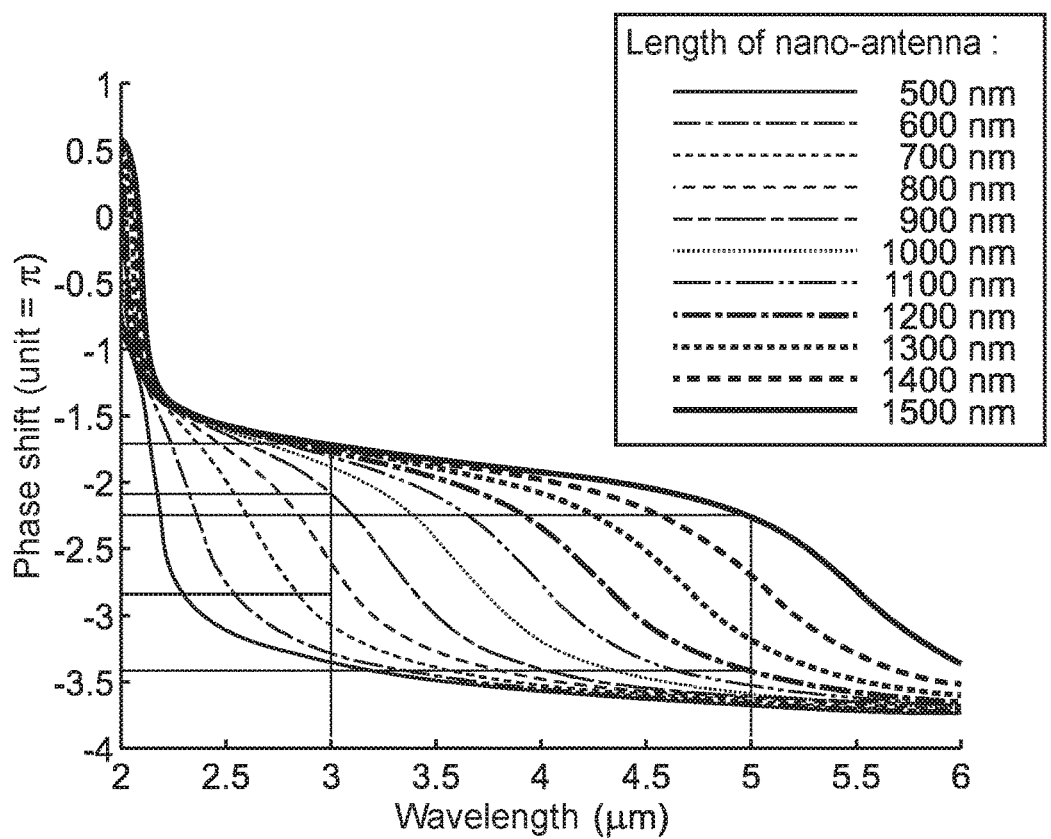
FIGS. 3c-3f are diagrams each as a function of the wavelength of the electromagnetic radiation, which show phase shift differences that exist between neighbouring areas for the nano-antenna distribution of FIG. 3b.
FIG. 3g shows a boundary direction associated with a phase shift difference that is produced for a first colour, for the second embodiments of the invention of FIGS. 3b-3f, and shows a first image pattern that results therefrom to detect the first colour.
Figure 3B:
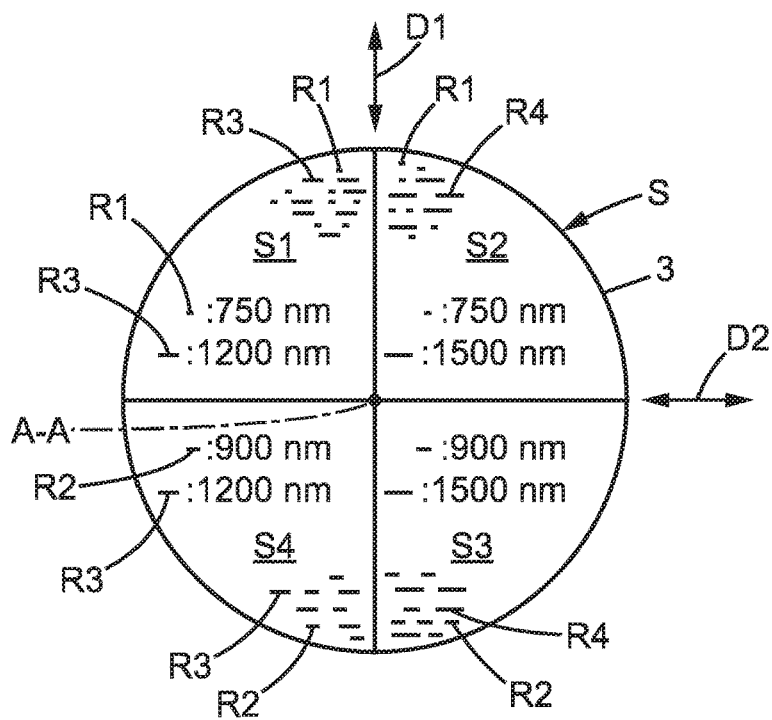
Figure 3C:
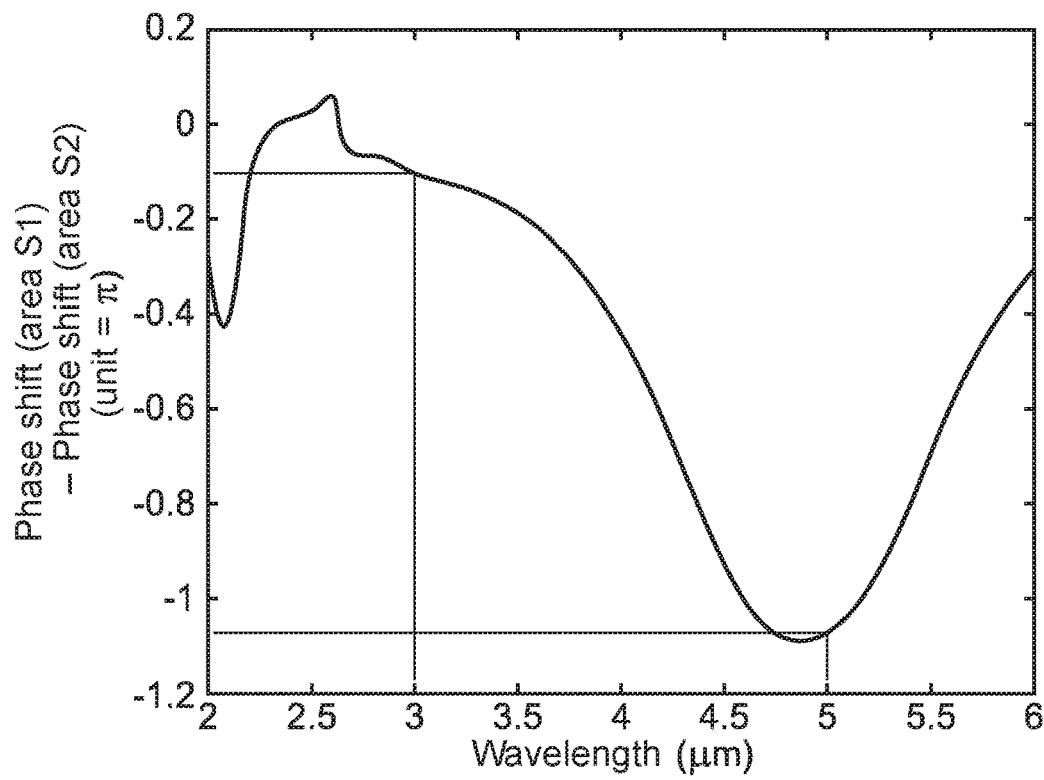
Figure 3D:
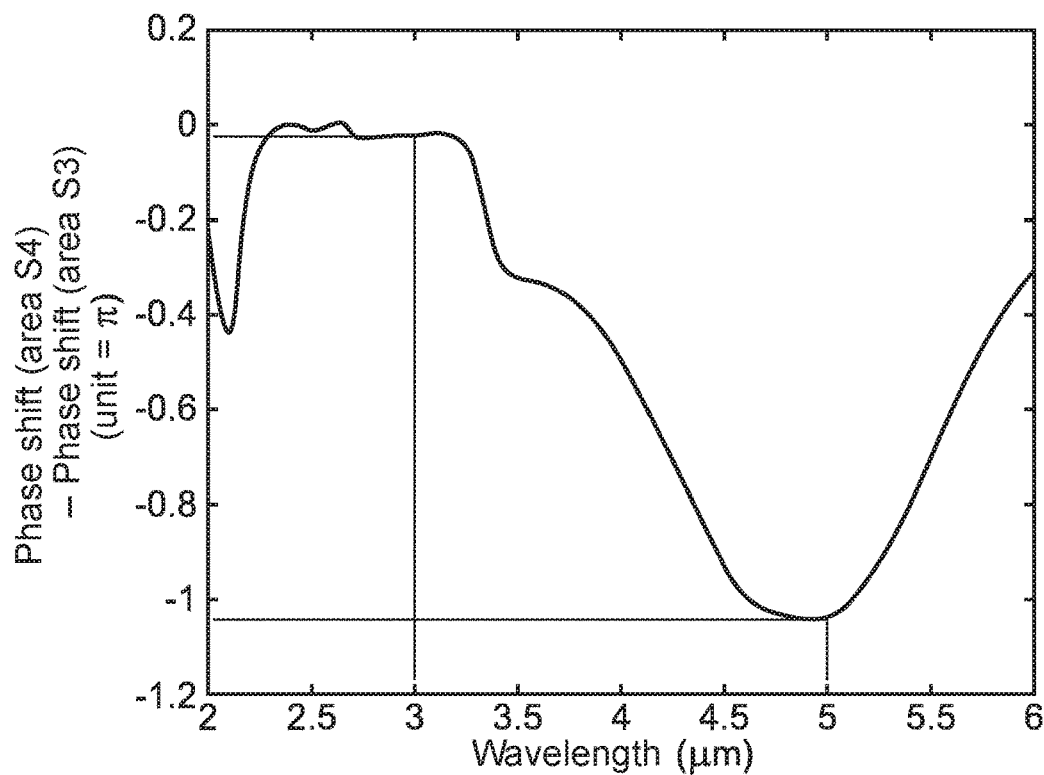
Figure 3E:
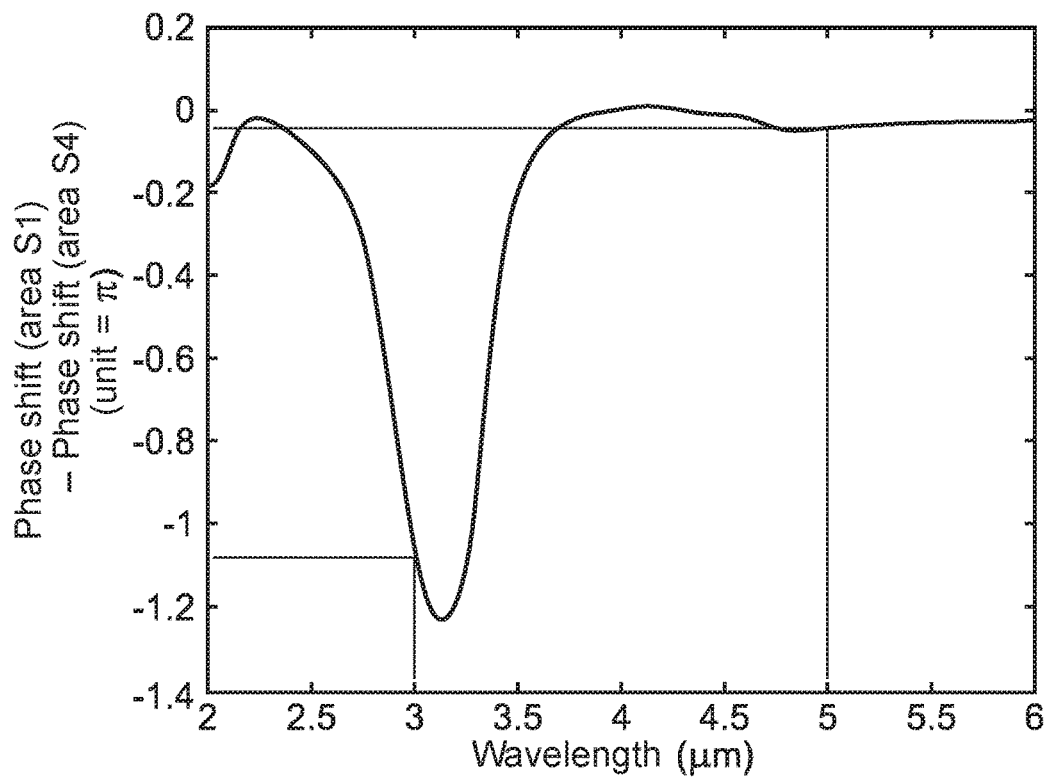
Figure 3F:
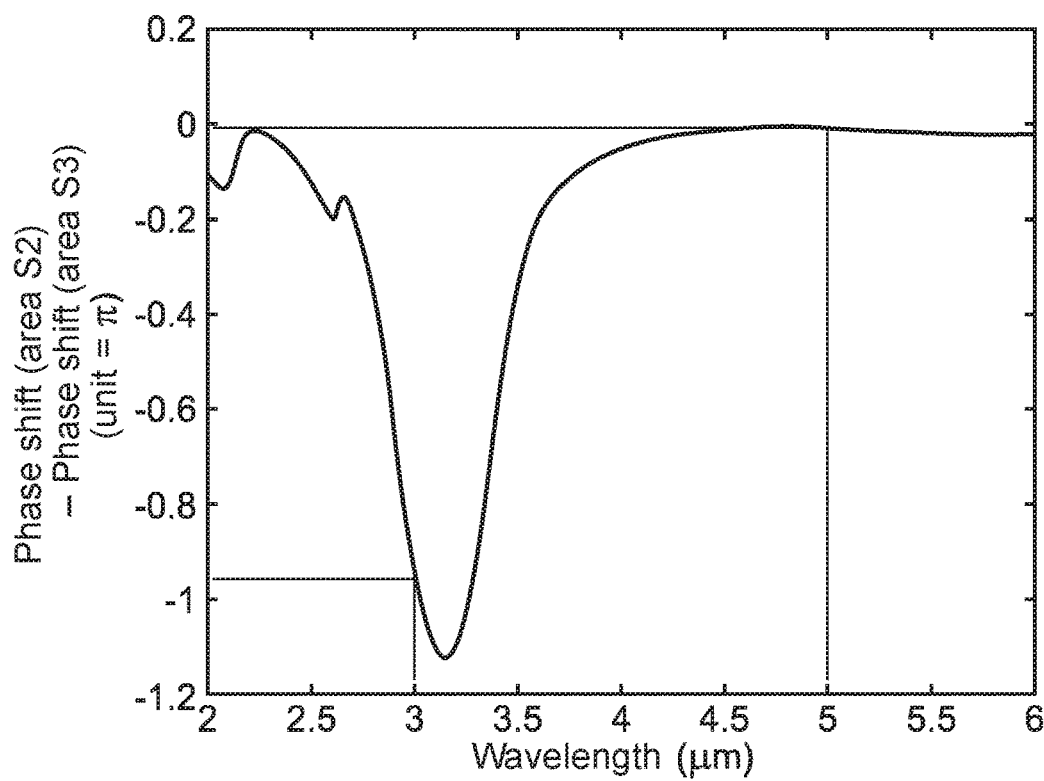
Figure 3G:
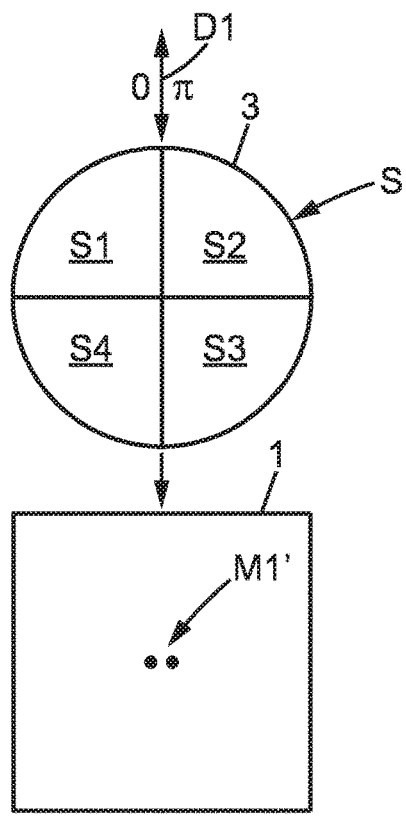
Figure 3H:
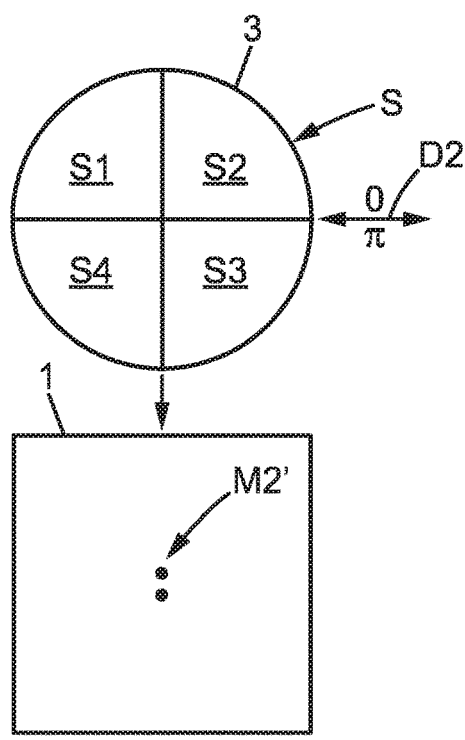
Figure 4:
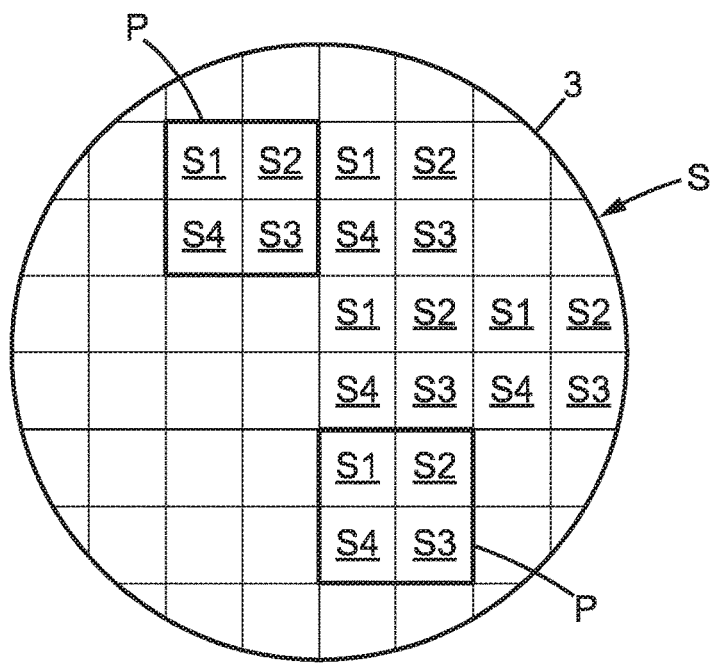
Figure 5:
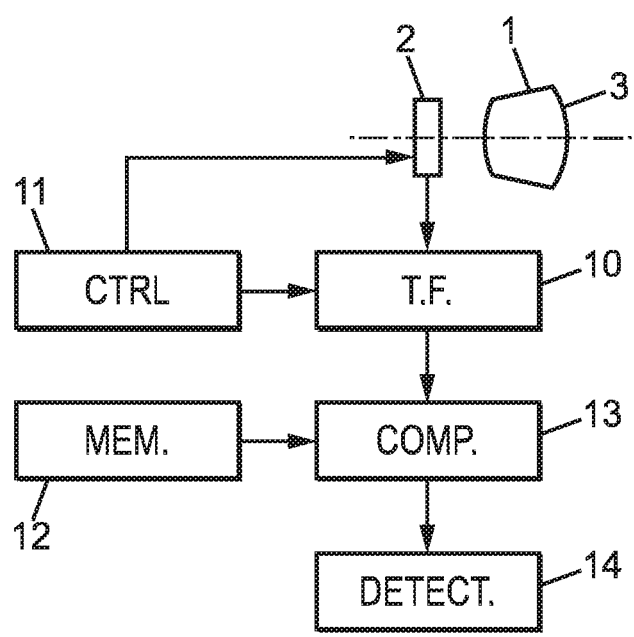
Figure 6A:
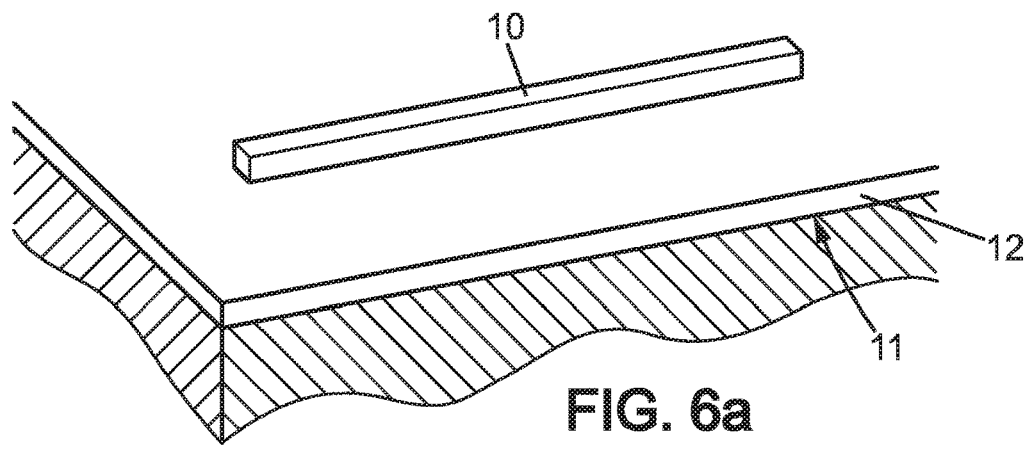
Figure 6B:
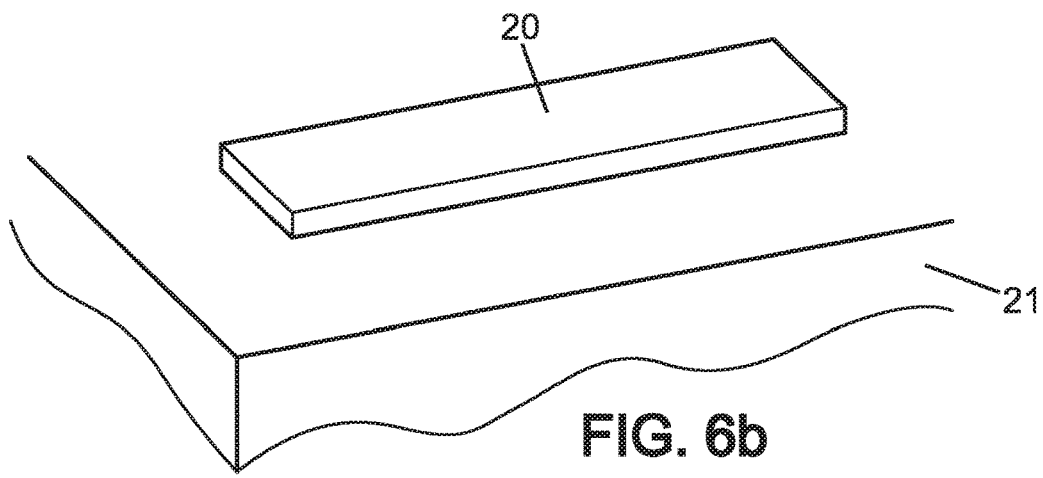
Figure 6C:
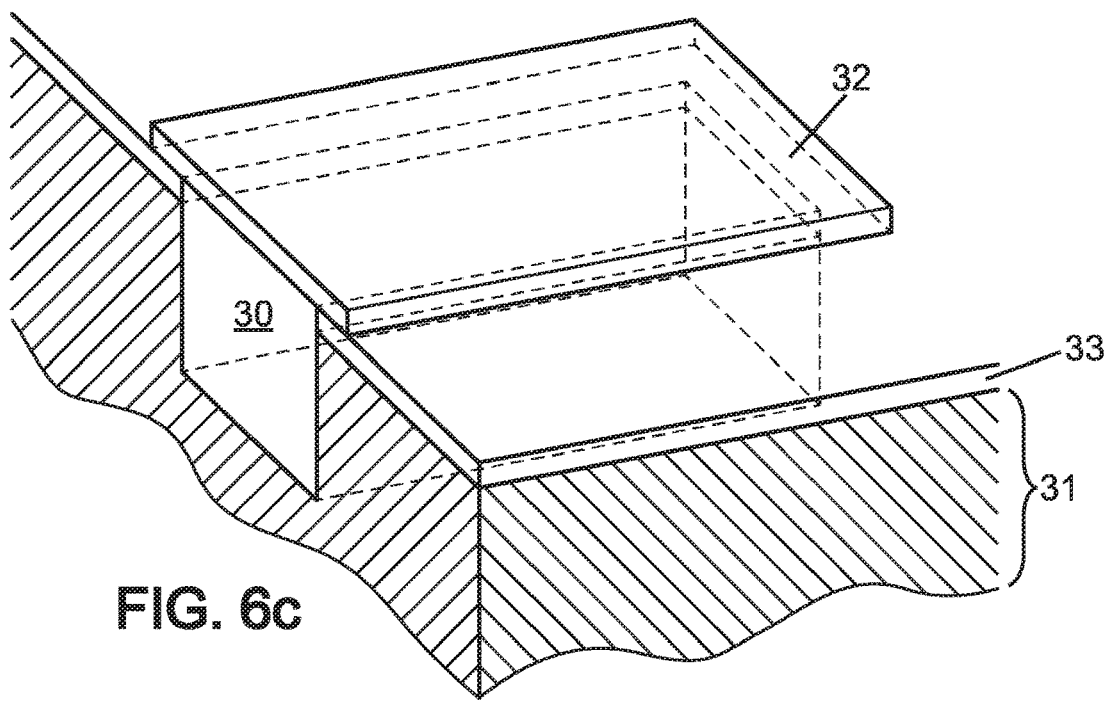

FIG. 3h corresponds to FIG. 3g for a second colour and for the same second embodiments of the invention, and shows a second image pattern that results therefrom to detect the second colour;

FIG. 4 illustrates an improvement of the invention, which may be adapted in particular to an embodiment of the invention with wide-angle or fish-eye type objective;

FIG. 5 shows various modules of a device according to the invention that constitutes a surveillance system; and FIGS. 6a, 6b and 6c are perspective views of three types of electromagnetic resonators that may be used in embodiments of the invention.

For clarity sake, the dimensions of the elements that are shown in these figures do not correspond to actual dimensions or to actual dimension ratios. Furthermore, identical references that are indicated in different figures designate identical elements or elements that have identical functions.

Figure 1:
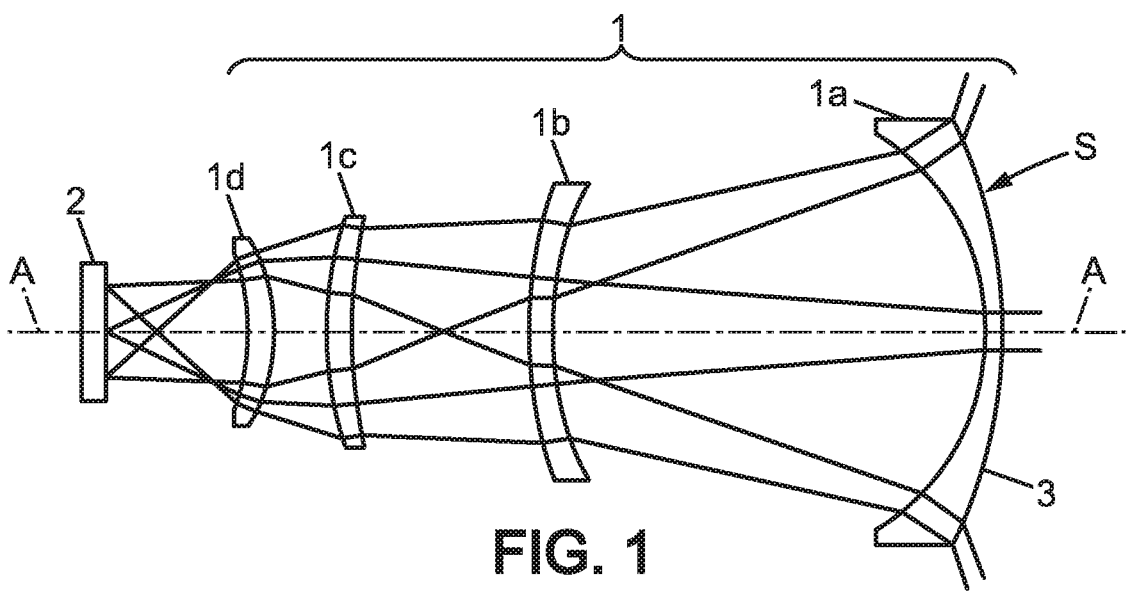

In accordance with FIG. 1, an imaging device may include an objective 1 that consists of a plurality of lenses, for example four lenses 1a-1d, and an image sensor 2. Possibly, the objective may include reflective optical components, such as aspherical mirrors, instead of at least some of the lenses. The objective 1 may be in particular of one of the wide-angle and extra-wide-angle (fish-eye) types, known by the Person skilled in the art, with in particular an angular aperture of the entrance optical field that may be greater than 120° (degree). The image sensor 2 is placed in the focal plane of the objective 1, and may be a matrix sensor of one of the models available commercially.

The references A-A and S in FIG. 1 indicate an optical axis of the imaging device and a section of this device that intersects the optical axis A-A. The section S has been called transverse section in the general part of the present description. It may be a pupil of the objective 1, or an optical face of one of the components of the objective 1, dioptric or reflective. Generally for the invention, the transverse section S is not necessarily flat, in particular when it corresponds to an optical face of one of the components of the objective 1. Preferably, the transverse section S does not correspond to an intermediate image plane. In possible embodiments of the invention, and in particular when the objective 1 is of wide-angle or fish-eye type, the transverse section S may be an input face of the objective 1, for example the optical front face of the lens 1a (FIG. 1).

In accordance with the invention, a supplementary component is added to the objective 1, whose function is to produce a colour indication in each image that is captured by the sensor 2. For this reason, this supplementary component is called optical component having a spectral differentiation function. It may be applied on an optical face of one of the components with imaging function of the objective 1, or form a separate optical component that is self-supported or that possesses a support different from the other optical components. In the embodiments of the invention that are described further, this optical component having a spectral differentiation function is superimposed with the transverse section S of the device as introduced above, and is referenced 3 in the figures. Thus, it is passed through by the light rays that originate from a scene contained in the entrance optical field of the imaging device, and that form an image of this scene on the image sensor 2.

In particular, when the objective 1 is of wide-angle or fish-eye type, an object that is situated in the entrance optical field and which has limited dimensions may appear in the image at the limit of the spatial resolution of the imaging device, or smaller than this resolution limit. In this case, replacing within each image the almost point or point appearance of this object with another pattern does not cause a loss of information in an aim of identification of the object. From this situation, the present invention, which consists in replacing within each captured image the appearance of the object with an image pattern that procures spectroscopic information about the electromagnetic radiation that is emitted by the object, constitutes a significant gain in information to succeed in identifying the object. Preferably, each image pattern that is used to express spectroscopic information according to the invention may have an extension that is reduced within each captured image, in order to mask as a minimum other scene elements that are also situated in the entrance optical field. Particularly, each image pattern that is used to express spectroscopic information may have dimensions in the captured image that are not much greater than the spatial resolution limit of the imaging device. For example, each image pattern used may have an extension in each image that is captured, which is in the order of a few pixels of the image sensor 2, preferably three or five pixels.

In first possible embodiments of the invention, which are now described with reference to FIGS. 2a-2c, the optical component 3 may be a wave plate made of transparent material, of uneven thickness. Such a wave plate may therefore be disposed within the objective 1 to coincide with the transverse section S.

Figure 2A:
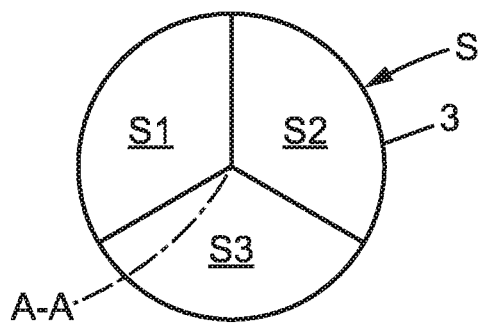

In accordance with FIG. 2a, such an optical component 3 may be divided in the transverse section S into three adjacent areas S1, S2 and S3 of identical sizes. For example, each of these areas may be an angular sector that extends from the intersection of the optical axis A-A with the transverse section S, with an angle at the apex of each area that is equal to $2 \cdot \pi/3$. The optical component 3 may consist within the area S1 of a first transparent plate with parallel faces, and with a thickness adapted to produce a phase lag of approximately $2 \cdot \pi/3$ in this area S1, for light rays that pass through the area S1 and that are of red colour, corresponding to wavelength values close to 760 nm (nanometre). Simultaneously, the component 3 consists of a second transparent plate with parallel faces in the area S2, with a plate thickness that is adapted to produce a phase lag of approximately $4 \cdot \pi/3$ also for light rays of red colour but that pass through the area S2. Finally, it consists of a third transparent plate with parallel faces in the area S3, with a plate thickness that is adapted to produce a phase lag of approximately $2 \cdot \pi$, which is equivalent to a substantially zero phase lag in this area S3, still for light rays of red colour but that pass through the area S3. These phase lags, or phase shifts, may be considered with respect to a propagation of light rays of red colour such as occurring in the imaging device in the absence of the component 3. Then a point or almost point source of red light that is present in the entrance optical field of the imaging device appears in each captured image in the form of three spots that are close together, at the location of the geometric image of this source in the image that is captured. This image pattern is designated by M1 in FIG. 2b. Possibly, the component 3 may be adapted so that the three spots of the image pattern M1 become closer to one another, so that the image pattern M1 becomes a triangle with a side length that is not much greater than the spatial resolution limit of the imaging device, for example a triangle side length that is between 3 and 5 pixels. In this way, a sufficient contrast may be maintained within each image that is captured by the image sensor 2, for the object from where the light rays of red colour come.

If the transparent material of the component 3 in the three areas S1, S2 and S3 has a refraction index value for a blue colour, corresponding to wavelength values close to 380 nm, which is substantially equal to that for the red colour, then the component 3 produces for the blue colour a phase lag that is equal to approximately $4 \cdot \pi/3$ in the area S1, and equal to approximately $8 \cdot \pi/3$ in the area S2, which is equivalent to a phase lag substantially equal to $2 \cdot \pi/3$ in said area S2, and a phase lag that is equal to approximately $4\pi$ in the area S3, equivalent again to a phase lag that is substantially zero in said area S3. The resulting image pattern for a point source of blue light, and that appears in each captured image at the location of the geometric image of this source, is that shown in FIG. 2c and designated by M2. It is again comprised of three spots that are close together, but with a general orientation rotated by $\pi/3$ in each captured image compared to the image pattern M1. The patterns M1 and M2 may also each appear simultaneously as stretchings or shifts of the point geometric image according to three directions that are angularly $\pi/3$ apart.

Thus, the identification of the image pattern M1 in a captured image indicates that the light radiation that is emitted by the source has a component of red colour, and the identification of the image pattern M2 indicates that it has a component of blue colour. A superimposition of the two image patterns M1 and M2, approximately in the shape of a six-pointed star, or a spot with six lobes, indicates that the light radiation that is emitted by the source simultaneously possesses a component of red colour and another component of blue colour, with respective spectral energies that are correlated with the respective light intensities of the two image patterns M1 and M2 in the superimposition.

Figure 2B:
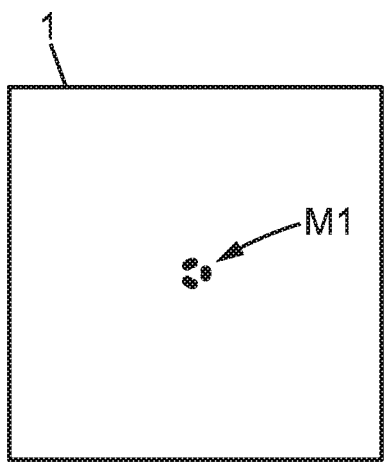
Figure 2C:
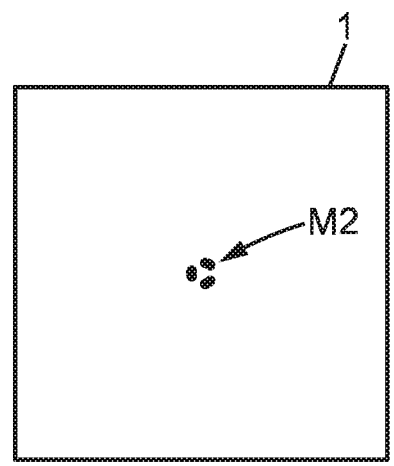

Although the embodiment that has just been described is based on a wave plate made of transparent material, the Person skilled in the art will understand upon reading the following description of second embodiments based on electromagnetic resonators, that the image patterns M1 and M2 in FIGS. 2b and 2c may also be produced by such electromagnetic resonators, when suitably selected. To this end, the area S1 may be dedicated to containing all the electromagnetic resonators of a first type, which are adapted to apply a phase shift $\varphi_1$ to the electromagnetic radiation of red colour and a phase shift $\varphi_2$ to the electromagnetic radiation of blue colour. Then, the area S2 will be dedicated to containing all the electromagnetic resonators of a second type, adapted to apply a phase shift $\varphi_1+2\pi/3$ to the radiation of red colour and a phase shift $\varphi_2+4\pi/3$ to the radiation of blue colour. In addition, the area S3 will be dedicated to containing all the electromagnetic resonators of a third type, adapted to apply a phase shift $\varphi_1+4\pi/3$ to the radiation of red colour and a phase shift $\varphi_2+8\pi/3$ or in an equivalent manner $\varphi_2+2\pi/3$, to the radiation of blue colour.

For all of the first embodiments of the invention that have just been described with reference to FIGS. 2a-2c, the portions of the transverse section S that are mentioned in the general description of the invention are formed one-by-one by the areas S1-S3.

Second possible embodiments of the invention are now described with reference to FIGS. 3a-3h. In one of these second embodiments, the optical component 3 consists of a distribution of electromagnetic resonators of metal-insulator-metal (MIM) nano-antenna type within the transverse section S.

In a known manner, and with reference to FIG. 6a, a MIM nano-antenna comprises a segment of metal material 10 that is disposed parallel to a continuous metal surface 11, while being isolated therefrom by an intermediate film 12 of insulating material. For example, the metal of the segment 10 and of the continuous surface 11 may be gold, and the intermediate film 12 may be made of silica ($SiO_2$) or epoxy polymer. Such a nano-antenna constitutes a Fabry-Pérot type electromagnetic resonator, with a resonance wavelength value which depends on the length of the segment 10, called nano-antenna length. In the following, each segment 10 possesses a width that is equal to 400 nm, parallel to the surface 11, and a thickness equal to 50 nm, perpendicular to the surface 11, these width and thickness being constant for all of the MIM nano-antennas considered. Then, an optical component 3 that consists of the continuous metal surface 11, the film of insulating material 12 disposed thereon, and a sufficiently dense distribution of metal segments 10 on the film of insulating material 12, on one side thereof that is opposite the continuous metal surface 11, forms an electromagnetic radiation reflector with adjustable phase shift. This phase shift, effective between the radiation that is reflected and the incident radiation, varies as a function of the wavelength of the radiation and may be adjusted by selecting the length of the metal segments 10 that are present at the location of the reflection. FIG. 3a shows the variations of this phase shift, expressed in unit of $\pi$, as a function of the wavelength of the electromagnetic radiation, for nano-antennas with length values of 500 nm, 600 nm, . . . , 1400 nm and 1500 nm. For FIG. 3a, the film of insulating material 12 is made of silica and has a thickness of 300 nm, the metal segments 10 are distributed according to a pitch that is substantially equal to 1.8 µm (micrometre) in two perpendicular directions, and the electromagnetic radiation is reflected perpendicular to the reflector. The polarisation effects of the radiation are not described here, supposing that they are known by the Person skilled in the art, and can be handled by using metal segments 10 that are oriented in two perpendicular directions in the transverse section S.

According to the diagram in FIG. 3a, a first nano-antenna reflector with nano-antenna length of 750 nm and a second nano-antenna reflector with nano-antenna length of 900 nm reflect an electromagnetic radiation that has a 3 µm (micrometre) wavelength, with a phase shift difference that is substantially equal to $0.75 \cdot \pi$. These same first and second reflectors reflect another electromagnetic radiation that has a 5 µm wavelength with a phase shift difference that is substantially zero. Similarly, a third nano-antenna reflector with nano-antenna length of 1200 nm and a fourth nano-antenna reflector with nano-antenna length of 1500 nm reflect the electromagnetic radiation of 3 µm wavelength with a phase shift difference that is also substantially zero, and reflect the electromagnetic radiation of 5 µm wavelength with a phase shift difference that is substantially equal to $1.25 \cdot \pi$.

Then, the optical component 3 of the second embodiments may be produced by dividing the transverse section S of the imaging device into four areas S1, S2, S3 and S4, for example four angular sectors each with right angle at its apex, from the optical axis A-A. As indicated in FIG. 3b, the optical component 3 may be obtained with a metal surface and an insulating film that are continuous throughout the transverse section S, and by using nano-antennas of lengths 750 nm and 1200 nm in the area S1, of lengths 750 nm and 1500 nm in the area S2, of lengths 900 nm and 1500 nm in the area S3, and of lengths 900 nm and 1200 nm in the area S4. Such combinations of pairs of types of nano-antennas within each of the areas S1, S2, S3 and S4 is possible because each nano-antenna has an effective section value that is much greater than the area occupied by the metal segment 10 of this nano-antenna within the transverse section S. The various types of nano-antennas are symbolically shown by dashes of different lengths in FIG. 3b: dashes R1 for the nano-antennas of length 750 nm, dashes R2 for the nano-antenna of length 900 nm, dashes R3 for the nano-antennas of length 1200 nm, and dashes R4 for the nano-antennas of length 1500 nm.

The connection between the present description of a second embodiment of the invention and the terms that were used in the general description of the invention is the following:
- the two areas S1 and S2 together form a first portion of the transverse section S that is dedicated to containing all the nano-antennas of 750 nm of length;
- similarly, the two areas S2 and S3 together form a second portion of the transverse section S that is dedicated to containing all the nano-antennas of 1500 nm of length;
- the two areas S3 and S4 together form a third portion of the transverse section S that is dedicated to containing all the nano-antennas of 900 nm of length;
- the two areas S4 and S1 together form a fourth portion of the transverse section S that is dedicated to containing all the nano-antennas of 1200 nm of length;
- the direction D1 is the direction of the boundary that separates the second and fourth portions of the transverse section S, called first boundary direction; and
- the direction D2, called second boundary direction, is the direction of the boundary that separates the first and third portions of the transverse section S.

The diagram in FIG. 3c shows the variations as a function of the wavelength of the radiation that is reflected by the optical component 3, of a phase shift difference that exists between a first portion of the radiation that is reflected in the area S1 and a second portion of the radiation that is reflected in the area S2. According to the diagram of FIG. 3c, the radiation of 3 µm wavelength undergoes a phase shift difference that is substantially zero between the areas S1 and S2, and the radiation of 5 µm wavelength undergoes a phase shift difference that is substantially equal to $(-)\pi$ between these same two areas S1 and S2. These precise phase shift difference values for the wavelengths of 3 µm and 5 µm, between adjacent areas, are obtained thanks to the association of two different types of nano-antennas in each area.

The diagram in FIG. 3d shows the variations as a function of the wavelength of the radiation that is reflected by the optical component 3, of a phase shift difference that exists between a fourth portion of the radiation that is reflected in the area S4 and a third portion of the radiation that is reflected in the area S3. According to the diagram in FIG. 3d, the radiation of 3 µm wavelength undergoes a phase shift difference that is again substantially zero, but now between the areas S3 and S4, and the radiation of 5 µm wavelength undergoes a phase shift difference that is again substantially equal to $(-)\pi$, between these two areas S3 and S4.

It then results from FIGS. 3b, 3c and 3d that the optical component 3 causes a phase shift difference, between the two sides of the boundary between the areas S1 and S2, which extends in a straight line between the areas S3 and S4, which is substantially zero for the radiation of 3 µm wavelength, and substantially equal to $\pi$ for the radiation of 5 µm wavelength. Consequently, the optical component 3 produces a stretching or a splitting of the image of a point or almost point source, perpendicular to the boundary direction D1, for a first radiation colour corresponding to the wavelength of 5 µm but not for a second radiation colour corresponding to the wavelength of 3 µm. The image pattern in FIG. 3g, noted M1' and called first image pattern, is therefore associated with the first colour that corresponds to the wavelength of 5 µm.

The diagram in FIG. 3e shows the variations as a function of the wavelength of the radiation that is reflected by the optical component 3, of the phase shift difference that exists between the first portion of the radiation that is reflected in the area S1 and the fourth portion of the radiation that is reflected in the area S4. According to the diagram in FIG. 3e, the radiation of 3 μm wavelength undergoes a phase shift difference that is substantially equal to (−)π between the areas S1 and S4, and the radiation of 5 μm wavelength undergoes a phase shift difference that is substantially zero between these two areas S1 and S4.

The diagram in FIG. 3f shows the variations as a function of the wavelength of the radiation that is reflected by the optical component 3, of the phase shift difference that exists between the second portion of the radiation that is reflected in the area S2 and the third portion of the radiation that is reflected in the area S3. According to the diagram in FIG. 3f, the radiation of 3 μm wavelength undergoes a phase shift difference that is again substantially equal to (−)π between the areas S2 and S3, and the radiation of 5 μm wavelength undergoes a phase shift difference that is again substantially zero between these two areas S2 and S3.

It then results from FIGS. 3b, 3e and 3f that the optical component 3 causes a phase shift difference, between the two sides of the boundary between the areas S1 and S4, which extends in a straight line between the areas S2 and S3, which is substantially equal to π for the radiation of 3 μm wavelength, and substantially zero for the radiation of 5 μm wavelength. Consequently, the optical component 3 produces a stretching or a splitting of the image of a point or almost point source, perpendicular to the boundary direction D2, for the second radiation colour corresponding to the wavelength of 3 μm but not for the first radiation colour corresponding to the wavelength of 5 μm. The image pattern in FIG. 3h, noted M2' and called second image pattern, is therefore associated with the second colour that corresponds to the wavelength of 3 μm.

Other embodiments of the invention may be designed, in particular on the model of that of FIGS. 3b-3h, by replacing the MIM nano-antenna electromagnetic resonators with electromagnetic resonators comprised of metal nano-rod disposed on insulating and transparent support. For example, in accordance with FIG. 6b, a gold nano-rod 20 that is disposed on a support made of silica 21 may be used to form each electromagnetic resonator. For such metal nano-rod resonators, the resonance is due to the appearance of surface plasmons when the wavelength of the incident radiation corresponds to a combination of dimensions of the nano-rod. The optical component 3 that is thus obtained is then functional for transmission of the light rays that form the image captured by the sensor 2. The phase shift that is produced for the electromagnetic radiation transmitted by the component 3 then depends on the dimensions of each nano-rod in each of the areas S1-S4, and also on the wavelength of the radiation. The Person skilled in the art may then refer to the scientific articles that are available on the subject of such electromagnetic resonators in order to obtain versions of the diagrams in FIGS. 3c-3f relating to nano-rod resonators on insulating and transparent support. From such diagrams, the method that has been presented for MIM nano-antenna resonators to design an optical component capable of revealing two colours, by suitably selecting the values of the parameters of resonators, may be easily transposed to nano-rod resonators.

Other embodiments of the invention may also be designed, by using electromagnetic resonators of Helmholtz resonator type instead of MIM nano-antennas. As illustrated in FIG. 6c, such Helmholtz resonators are each formed by combining a nano-cavity 30 that is arranged in a common metal surface 31, with an additional metal portion 32 that partially seals the nano-cavity 30 whilst being electrically isolated from the common metal surface 31. For example, a film of insulating material 33, for example a film of silica, may be intermediate between each additional metal portion 32 and the common metal surface 31. The common metal surface 31 serves as a base reflector, and the Helmholtz resonators modify the reflection features in a way that depends on the wavelength of the incident radiation. The metal surface 31 and the film of insulating material 33 may be common to all Helmholtz resonators, each having a nano-cavity 30 and an additional metal portion 32 separately from the other resonators. Within each Helmholtz resonator, the nano-cavity 30 possesses an inductive behaviour, and the additional metal portion 32 forms a capacitor with the metal surface 31 around the nano-cavity. In a known manner, each Helmholtz resonator that is thus formed has a reflection resonance for the electromagnetic radiation that is incident, with phase shift and resonance features as functions of the wavelength of the incident radiation which depend on the dimensions of the nano-cavity, those of the additional metal portion and also depend on the thickness of the insulating film 33 between the additional metal portion 32 and the peripheral edge of the nano-cavity 30. In the same way as previously, the Person skilled in the art will be able to transpose the second embodiment based on MIM nano-antennas that has been described with reference to FIGS. 3b-3h, to an embodiment of the invention based on Helmholtz resonators.

In a manner that is also known to the Person skilled in the art, the resonance features of electromagnetic resonators, such as those that have just been cited—MIM nano-antennas, nano-rods, Helmholtz resonators—vary as a function of the polarisation of the incident electromagnetic radiation. It is then possible to obtain an optical component 3 that is only effective for the incident radiation that is polarised according to a fixed direction, this latter being determined by the shape and orientation of the resonators in the transverse section S. Alternatively, it is also possible to obtain an optical component 3 that is effective in the same way for two perpendicular polarisations, by associating in each area of the transverse section S resonators that are of a same type but that are oriented some for one of the polarisation directions of the incident radiation and others for the perpendicular polarisation direction.

It is also possible to produce image patterns that are different from those M1 (FIG. 2b), M2 (FIG. 2c), M1' (FIG. 3g) and M2' (FIG. 3h), as colour indicators in the incident radiation, by increasing the number of areas in the partition of the transverse section S of the imaging device. Particularly, adopting more than four angular sectors may make it possible to produce stretchings or splittings of images of point sources according to more different directions in the image that is captured, and thus reveal more colours that are spectrally separated. It is also possible to adopt shapes for the areas other than angular sectors, and to select values of phase shift differences between neighbouring areas, other than 0 and π. The Person skilled in the art will therefore understand that any image pattern can be associated with a colour that is to be sought in the radiation emitted by a point or almost point source, by creating an appropriate phase shift distribution, effective for the radiation of this colour, through the transverse section S of the imaging device.

In further possible embodiments of the invention, the optical component 3 may be designed to produce a phase shift vortex for the radiation that is transmitted or reflected by said component 3. Then, the image pattern in each image that is captured is a light ring, which has a radius that depends on the wavelength of the radiation that is emitted by the object forming point or almost point light source, and for which the vortex is continuous.

For the embodiments of the invention that have been described above, the portion of the transverse section S such as introduced in the general description of the invention, corresponds to the entire transverse section of the imaging device. But in some circumstances, in particular when the objective 1 is of the wide-angle or fish-eye type, it may be advantageous to repeat the phase shift pattern in the transverse section S so that a light beam that comes from any direction within the entrance optical field and that forms the image of an object on the image sensor 2, is affected by the entire phase shift pattern. In FIG. 4, the phase shift pattern with four areas S1-S4 is limited within a square P that is smaller than the entire transverse section S, and this square pattern with four areas S1-S4 is repeated to form a tiling of the transverse section S. For this alternative embodiment of the invention, each square P that constitutes a repetition of the phase shift pattern is a portion of the transverse section S within the meaning of the general description of the invention.

With reference to FIG. 5, a detection and/or surveillance system that is formed from a device for imaging and delivering spectroscopic information according to the invention, may further comprise driver means for analysing images and detecting objects that would be present in the entrance optical field. The image analysis means, referenced 10, may be adapted to produce a Fourier transform of each image that is captured by the sensor 2 in presence of the optical component 3. Indeed, such analysis by Fourier transform may be particularly effective for revealing the presence, in each captured image, of an image pattern that is associated with a colour sought in the radiation that formed this image. An output of the analysis means 10 may be an indication of presence or absence of each colour sought in all or part of the entrance optical field, and optionally with an intensity indication for the radiation of this colour. Comparison means 13 may then be provided to compare the spectroscopic indications that are delivered by the analysis means 10, for each captured image or a sample thereof, with spectroscopic criteria that are stored in a memory module 12. When the criteria stored in the module 12 characterise a threat, for example when they correspond to a thermal radiation that is likely to be produced by the reactor of a missile, a detection module 14 may be provided to produce an appropriate alarm signal. In order to also reduce the probability of false alarm of such surveillance system which operates by imaging and spectroscopic information delivery, it is possible to correlate in addition the detection, in at least one of the images, of an object that meets the spectroscopic criteria stored in memory with a characterisation of a movement of this object that appears between successively captured images. Particularly, a system such as illustrated in FIG. 5 may be a missile launch detector, or MLD.

In a manner known to the Person skilled in the art, all of the components of the detection and/or surveillance system are controlled and synchronised by the controller 11, which constitutes the driver means.

Generally, to implement the invention, the image of the object by the imaging device does not need to be smaller than the spatial resolution limit of this device. Indeed, image processes may be used, which deliver the point spread function (or PSF), or sufficient features of said function, from the image of an object that is larger, or much larger, than the spatial resolution limit of the device. In other words, the imaging pattern that is characteristic of one colour by using the invention, may be extracted from the image of an object even if this object is spatially resolved. In this case, the device of the invention accumulates a usual imaging function, without colorimetric filtering, with a colour detection function that is added by the optical component having a spectral differentiation function. In other words, a colour imaging function is obtained by the invention, without using colour filters or separation of the optical path into a plurality of spectral channels within the device.

The invention may also be reproduced by modifying many secondary features with respect to the embodiments that have been described in detail above. For example, the areas in the transverse section S are not necessarily angular sectors or unions of angular sectors. They may have any geometrical, symmetrical or asymmetrical shapes, being understood that their respective surfaces limit the fraction of the incident radiation that is subjected to each phase shift value produced by the optical component having a spectral differentiation function.

Finally, it is reminded that the invention is not limited to the detection of threats that would be likely to appear within a surveillance field, and that it may be applied to multiple other applications, including satellite remote detection, the detection of birds within an airport area, etc.

The invention claimed is:

1. A device for imaging and delivering spectroscopic information, comprising:
   an objective, adapted to form in a focal plane an image of a scene that is contained in an entrance optical field of the device;
   an image sensor, which is disposed in the focal plane to capture the image of the scene; and
   at least one optical component having a spectral differentiation function, which is placed on a path of light rays between the scene and the focal plane, said optical component being adapted to modify an image of a point of the scene when the objective is provided with said optical component, when compared to the image of the same point of the scene as formed by the objective devoid of said optical component, in different ways for at least two possible colours for the light rays that originate from the point of the scene, so that a form of the image of the point of the scene, which appears in the image as captured by the image sensor, delivers spectroscopic information about said point of the scene,
   wherein the optical component having a spectral differentiation function is adapted to phase-shift light rays that come from a same point of the scene but that pass through two different portions of a transverse section of the device, in accordance with a first phase shift difference effective between said two portions for a first colour possible for said light rays, and in accordance with a second phase shift difference effective also between the same two portions but for a second colour possible for said light rays, the first and second colours being spectrally separated, and the first and second phase shift differences being different,
   and wherein the optical component having a spectral differentiation function includes identical electromagnetic resonators that are each efficient for phase-shifting and/or attenuating light rays in a variable manner when a colour of said light rays varies with respect to a resonance wavelength of each resonator, said identical resonators being distributed in one of the portions of the transverse section of the device, with the exception of at least another one of the portions of said transverse section of the device.

2. The device of claim 1, wherein the optical component having a spectral differentiation function is adapted to modify the image of the point of the scene according to a first image pattern for light rays of a first colour that originate from said point of the scene, and to modify the image of the point of the scene according to a second image pattern for light rays of a second colour that originate from said point of the scene, the first and second colours being spectrally separated, and the first and second image patterns being different.

3. The device of claim 1, wherein the optical component having a spectral differentiation function is adapted to stretch, shift or split the image of the point of the scene, in the image as captured by the image sensor, according to stretching, shifting or splitting directions that are different between the two possible colours for the light rays that originate from the point of the scene.

4. The device of claim 1, wherein the optical component having a spectral differentiation function includes electromagnetic resonators of a plurality of different types, corresponding to resonance wavelengths that are different between resonators of different types, or corresponding to phase shift values relative to a same wavelength that are different between resonators of different types, and wherein the resonators of each type are contained in a portion of the transverse section of the device that has at least one edge with an orientation, within said transverse section of the device, different from the orientation of at least one edge of each other portion of the transverse section of the device that contains resonators of another type.

5. The device of claim 4, wherein the optical component includes N types of electromagnetic resonators, N being an integer between 1 and 33, and wherein a portion of the transverse section of the device is divided into N areas from a central point of the portion of transverse section, and each portion of the transverse section of the device, which is dedicated to containing all the electromagnetic resonators of one of the types, is formed within the portion of transverse section by a selection of one or more of the areas, said selection being specific to said type of resonators in relation to other types of resonators.

6. The device of claim 5, wherein N is equal to 3, and the portion of the transverse section of the device is divided into first, second and third areas,
the electromagnetic resonators of first, second and third types being contained separately in the first, second and third areas, with only one of the types of electromagnetic resonators per area,
and the electromagnetic resonators being adapted to produce phase shift differences that are equal to $2\cdot\pi/3\pm\pi/4$ for a first colour when passing from one of the areas to another according to a route oriented in the portion of transverse section, and equal to $4\cdot\pi/3\pm\pi/4$ for a second colour when passing from one of the areas to another according to the same route oriented in the portion of transverse section, said first and second colours being spectrally separated.

7. The device of claim 5, wherein N is equal to 4, the portion of the transverse section of the device is divided into first, second, third and fourth areas,
the electromagnetic resonators of first, second, third and fourth types being contained in the first, second, third and fourth areas with two types of electromagnetic resonators per area, and by varying only one type of electromagnetic resonators between two areas that are neighbours within the portion of transverse section,
and the electromagnetic resonators being adapted to produce phase shift differences that are equal to:

$\pi\pm\pi/4$ for a first colour between those of the areas that are separated according to a first boundary direction within the portion of transverse section;
$0\pm\pi/4$ for said first colour between those of the areas that are separated according to a second boundary direction different from said first boundary direction within the portion of transverse section;
$\pi\pm\pi/4$ for a second colour between those of the areas that are separated according to the second boundary direction within the portion of transverse section, the first and second colours being spectrally separated; and
$0\pm\pi/4$ for said second colour between those of the areas that are separated according to the first boundary direction within the portion of transverse section.

8. The device of claim 5, wherein a pattern that is formed by the areas contained in the portion of the transverse section of the device, with the electromagnetic resonators that are contained in each of said areas, is repeated in the transverse section of the device so as to form a tiling of said transverse section.

9. The device of claim 1, wherein each electromagnetic resonator is a nano-antenna of metal-insulator-metal type, and the optical component having a spectral differentiation function is used to reflect the light rays within the device,
or is a metal nano-rod that is disposed on a transparent support, and the optical component having a spectral differentiation function is used to transmit the light rays through said transparent support within the device,
or is a cavity or a portion of a dielectric material that is between at least two electrically conductive portions, and that forms a Helmholtz resonator efficient in reflection for an electromagnetic radiation impinging onto said cavity or portion of dielectric material, and the optical component having a spectral differentiation function is used to reflect the light rays within the device.

10. The device of claim 1, wherein the optical component having a spectral differentiation function is disposed on an optical face of a lens of the objective, or forms a reflective optical face of the objective, in both cases preferably an input optical face of said objective.

11. The device of claim 1, further comprising means for analysing the image of the scene that is captured by the image sensor, said analysis means being adapted to apply a Fourier transform process to said image of the scene, and to produce the spectroscopic information from a result of the Fourier transform process.

12. The device of claim 11, included in an optical surveillance system, wherein the objective is of a wide-angle or fish-eye type, and the device further comprises:
driver means, which are adapted to control successive image captures by the image sensor when the objective is provided with the optical component having a spectral differentiation function, and to control the analysis means so as to deliver the spectroscopic information for at least one point of the scene from each captured image;
memory means, which are adapted to store at least one spectroscopic criterion;
comparison means, which are arranged to compare with the criterion stored in memory, the spectroscopic information delivered for the point of the scene from at least one of the captured images; and detection means, which are adapted to produce a positive detection message when the spectroscopic information that is obtained for the point of the scene corresponds to the criterion stored in memory.

* * * * *